(12) United States Patent
Fan et al.

(10) Patent No.: US 10,423,271 B2
(45) Date of Patent: Sep. 24, 2019

(54) TOUCH CONTROL ARMREST SLEEVE AND TOUCH CONTROL SEAT

(71) Applicants: Tsinghua University, Beijing (CN); HON HAI PRECISION INDUSTRY CO., LTD., New Taipei (TW)

(72) Inventors: Shou-Shan Fan, Beijing (CN); Liang Liu, Beijing (CN); Li Qian, Beijing (CN); Yu-Quan Wang, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 5 days.

(21) Appl. No.: 15/458,574

(22) Filed: Mar. 14, 2017

(65) Prior Publication Data

US 2017/0308224 A1 Oct. 26, 2017

(30) Foreign Application Priority Data

Apr. 25, 2016 (CN) ...................... 2016 2 0351017 U

(51) Int. Cl.
| | |
|---|---|
| *G06F 3/041* | (2006.01) |
| *G06F 3/0354* | (2013.01) |
| *B60N 2/75* | (2018.01) |
| *B60N 2/02* | (2006.01) |
| *G06F 3/044* | (2006.01) |
| *B60N 2/58* | (2006.01) |

(52) U.S. Cl.
CPC ......... *G06F 3/0416* (2013.01); *B60N 2/0224* (2013.01); *B60N 2/0228* (2013.01); *B60N 2/58* (2013.01); *B60N 2/797* (2018.02); *G06F 3/03547* (2013.01); *G06F 3/044* (2013.01); *G06F 2203/04102* (2013.01)

(58) Field of Classification Search
CPC ... G06F 3/041–047; G06F 2203/04102; G06F 2380/02; G06F 3/0416; G06F 3/044; G06F 3/03547; G09G 2380/02; B60N 2/0228; B60N 2/58; B60N 2/0224; B60N 2/797

See application file for complete search history.

(56) References Cited

U.S. PATENT DOCUMENTS

2010/0317409 A1* 12/2010 Jiang .................... G06F 1/1626
455/566
2011/0299015 A1* 12/2011 Liu ...................... G02F 1/13338
349/96
2015/0130754 A1* 5/2015 Yairi ....................... G06F 3/044
345/174

(Continued)

*Primary Examiner* — Roberto W Flores
(74) *Attorney, Agent, or Firm* — ScienBiziP, P.C.

(57) ABSTRACT

A touch control armrest sleeve includes an body and a connecting portion. The body includes a flexible pad, a flexible touch panel and a protective cover. The connecting portion is connected to a first end and a second end of the body. The flexible touch panel includes a flexible substrate and a carbon nanotube touch function layer. The carbon nanotube touch function layer includes a carbon nanotube film, a plurality of first electrodes, and a plurality of second electrodes. The carbon nanotube film is located on the flexible substrate. The plurality of first electrodes and the plurality of second electrodes are electrically connected to the carbon nanotube film. A touch control seat incorporating such touch control armrest sleeve is also provided.

20 Claims, 5 Drawing Sheets

(56) References Cited

U.S. PATENT DOCUMENTS

2016/0162147 A1* 6/2016 Xie .................. G06F 3/044
                                              345/173
2016/0299526 A1* 10/2016 Inagaki ............ G02F 1/133305
2016/0306393 A1* 10/2016 Huitema ............ G06F 3/0346
2017/0092230 A1*  3/2017 Kuwabara ............ G06F 3/1423

* cited by examiner

TOUCH CONTROL ARMREST SLEEVE AND TOUCH CONTROL SEAT

CROSS-REFERENCE TO RELATED APPLICATIONS

This application claims all benefits accruing under 35 U.S.C. § 119 from China Patent Application No. 201620351017.6, filed on Apr. 25, 2016, in the China Intellectual Property Office, the contents of which are hereby incorporated by reference.

FIELD

The present disclosure relates to a touch control armrest sleeve and a touch control seat.

BACKGROUND

Users operate electronic devices with touch functions by touching the display screen with their fingers. For example, when an iPad is placed on a table, users seated on a seat farther away from the iPad have to leave the seat to touch the display screen of the iPad. For frequent switching touch function, in particular, leaving the seat to touch the display screen is not convenient.

BRIEF DESCRIPTION OF THE DRAWINGS

Implementations of the present technology will now be described, by way of example only, with reference to the attached figures, wherein.

DETAILED DESCRIPTION

Figure 1:
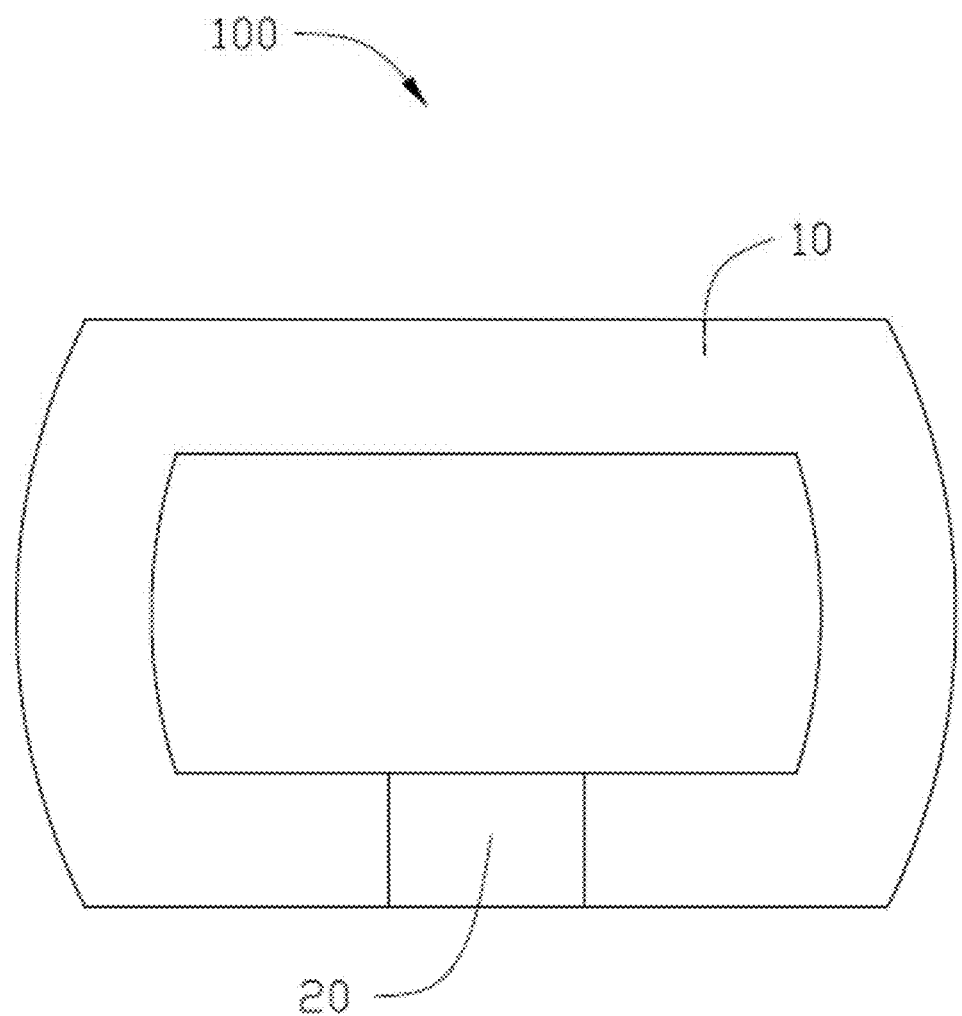
FIG. 1 is a structure schematic view of an embodiment of a touch control armrest sleeve.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Figure 2:
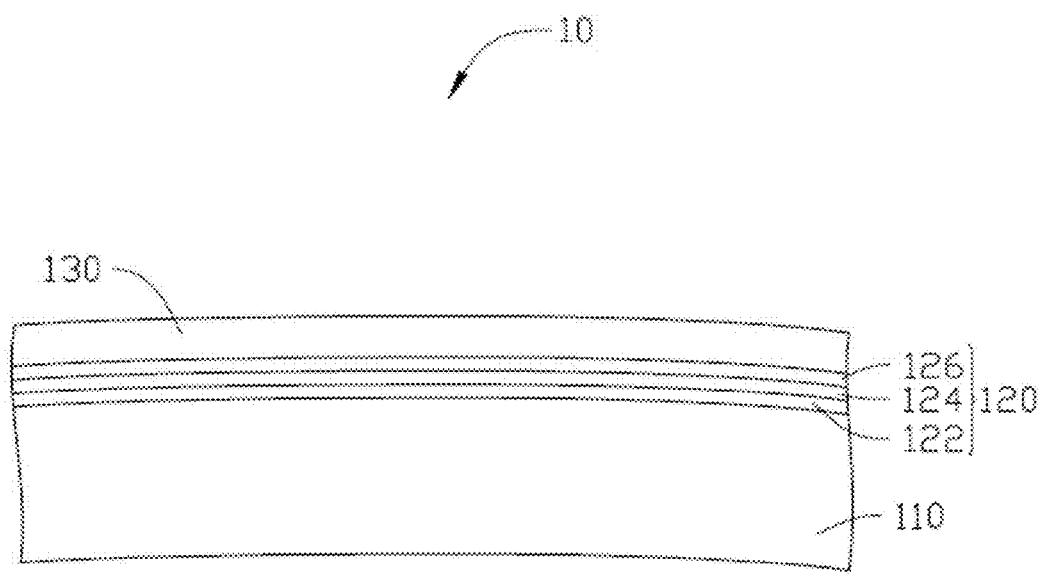
FIG. 2 is a sectional schematic view of part of an embodiment of a body of the touch control armrest sleeve.
Figure 3:
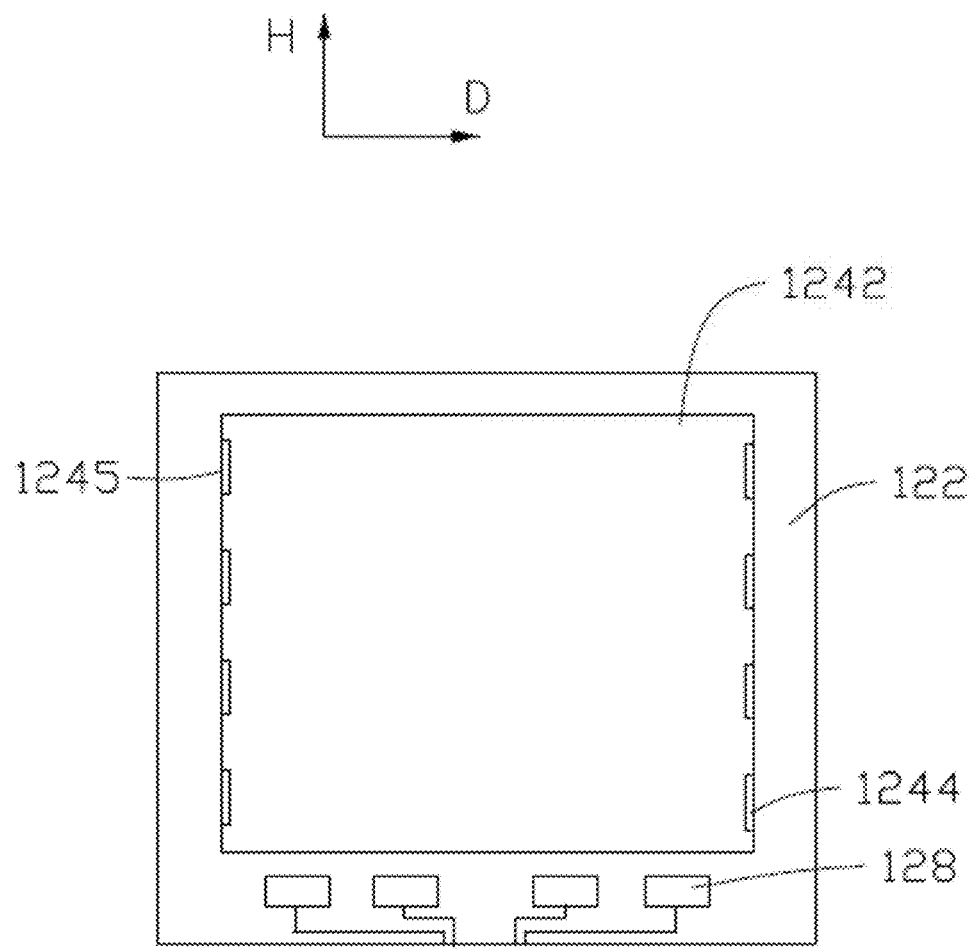
FIG. 3 is an overview of an embodiment of a carbon nanotube touch function layer utilized in the touch control armrest sleeve of FIG. 1.

Referring to FIG. 1 to FIG. 3, the present disclosure is described in relation to a touch control armrest sleeve 100. The touch control armrest sleeve comprises a body 10 and a connecting portion 20. The body 10 comprises a first end and a second end opposite to the first end. The first end and the second end is connected by the connecting portion 20. The body 10 comprises a flexible pad 110, a flexible touch panel 120, and a protective cover 130. The flexible touch panel 120 is located on the flexible pad 110. The protective cover 130 wraps the flexible touch panel 120. The flexible touch panel 120 is located between the protective cover 130 and the flexible pad 110.

The flexible touch panel 120 is an elastic structure. The flexible touch panel 120 comprises a flexible substrate 122 and a carbon nanotube touch function layer 124. The carbon nanotube touch function layer 124 comprises a carbon nanotube film 1242, a plurality of first electrodes 1244, and a plurality of second electrodes 1245. The carbon nanotube film 1242 is located on a surface of the flexible substrate 122. Both the plurality of first electrodes 1244 and the plurality of second electrodes 1245 are electrically connected to the carbon nanotube film 1242. The carbon nanotube touch function layer 124 is a single layer structure. The single layer structure means that the carbon nanotube touch function layer 124 only comprises one carbon nanotube film 1242. The positions of touches occurring on a surface of the protective cover 130 can be sensed by the carbon nanotube touch function layer 124.

The body 10 is a flexible planar structure. The body 10 comprises a width direction and a length direction. The body 10 is bendable along the length direction. The body 10 is connected to the connecting portion 20 along the length direction to form the touch control armrest sleeve 100. The touch control armrest sleeve 100 can have an annular structure when it is sleeved on an armrest. The body 10 can be deformed in accordance with a shape of the article to be nested. Thus a shape of the touch control armrest sleeve 100 is not limited.

The flexible pad 110 is an elastic structure, which can provide a cushion for user's arms. The flexible pad 110 has a certain thickness. A material of the flexible pad 110 can be sponge, fabric, cotton, plastic foam, or the like. The flexible pad 110 may deform while being pressed by the user's arms and restores to its original shape after a pressure disappears.

The protective cover 130 is located outside of the flexible touch panel 120. In one embodiment, the protective cover 130 wraps the flexible touch panel 120 and the flexible pad 110. A material of the protective cover 130 can be selected from animal leather, artificial leather, or fabric. The protective cover 130 has a smaller thickness. In one embodiment, a thickness of the protective cover 130 is in a range from about 1 micron to about 5 millimeters.

An outer surface of the protective cover 130 can be printed with a first pattern. The first pattern can indicate a position of the carbon nanotube touch function layer 124. In one embodiment, the flexible touch panel 120 further includes a keyboard 128, and the outer surface of the protective cover 130 is printed with a second pattern, the second pattern indicates a position of the keyboard 128.

The flexible touch panel 120 is an elastic structure. The flexible touch panel 120 comprises a flexible substrate 122 and a carbon nanotube touch function layer 124. The flexible substrate 122 is an elastic sheet structure. An elastic deformation of the flexible substrate 122 when pressed is substantially equal to that of the flexible pad 110. The flexible substrate 122 may have greater deformation when pressed by the user's arms and will restore to its original shape after the pressure disappears. A thickness of the flexible substrate 122 can be in a range from about 1 micron to about 2 millimeters. The carbon nanotube touch function layer 124 is fixed on a surface of the flexible substrate 122. The carbon nanotube film 1242 can adhere to the surface of the flexible substrate 122 by its own Van der Waals force. The carbon nanotube film 1242 can also be fixed to the surface of the flexible substrate 122 by an adhesive. In one embodiment, the plurality of first electrodes 1244 is a conductive layer formed by printing a conductive paste on a surface of the carbon nanotube film 1322. A material of the plurality of first electrodes 1244 can be metal having good electrical conductivity, such as silver, gold, or copper. The carbon nanotube film 1242 comprises a first surface and a second surface opposite to the first surface. The first surface can be bonded to the flexible substrate 122 and the second surface can be directly bonded to the protective cover 130.

In one embodiment, the flexible touch panel 120 further comprises a flexible protective layer 126. The flexible protective layer 126 is located on the second surface of the carbon nanotube film 1242. The carbon nanotube film 1242 is located between the flexible protective layer 126 and the flexible substrate 122. The flexible protective layer 126 is an elastic sheet structure. A laminated structure can be formed by the flexible protective layer 126, the carbon nanotube film 1242, and the flexible substrate 122. The laminated structure may have an elastic deformation while being pressed by the user's arms and will restore to its original shape after the pressure disappears. The flexible protective layer 126 has a smaller thickness. In one embodiment, a thickness of the flexible protective layer 126 is in a range from about 0.5 microns to about 1 millimeter. Both a material of the flexible substrate 122 and a material of the flexible protective layer 126 can be organic polymer. The organic polymer can comprise cellulose triacetate (TAC), polystyrene, polyethylene, polycarbonate (PC), poly (methyl methacrylate) (PMMA), Polyethylene terephthalate (PET), benzocyclobutene (BCB), polycycloolefin, and the like.

The carbon nanotube touch function layer is a single layer structure capable of realizing a touch function. The carbon nanotube touch function layer 124 comprises a carbon nanotube film 1242, a plurality of first electrodes 1244, and a plurality of second electrodes 1245. The carbon nanotube film 1242 comprises a plurality of carbon nanotubes. The plurality of the carbon nanotubes in the carbon nanotube film 1242 are arranged substantially along a same direction. Thus, the conductivity of the carbon nanotube film 1242 along an extension direction of the plurality of the carbon nanotubes is far greater than a conductivity other directions. An end of one carbon nanotube is joined to an end of an adjacent carbon nanotube arranged substantially along the same direction by Van der Waals force, to form a free-standing film. The carbon nanotube film 1242 is formed by laminating the plurality of carbon nanotubes by Van der Waals forces, and the plurality of carbon nanotubes has excellent bend resistance and toughness; thus, the carbon nanotube film 1242 can be arbitrarily bent along with the flexible substrate 122 without being damaged. The flexible touch panel 120 will continue to work after many repeated bending cycles.

The carbon nanotube film 1242 can be a drawn carbon nanotube film formed by drawing from a carbon nanotube array. The plurality of carbon nanotubes are arranged substantially parallel to a surface of the drawn carbon nanotube film and arranged substantially along the same direction. When the carbon nanotube film 1242 is bonded to the flexible substrate 122, the plurality of carbon nanotubes is arranged substantially parallel to a surface of the flexible substrate 122.

Figure 4:
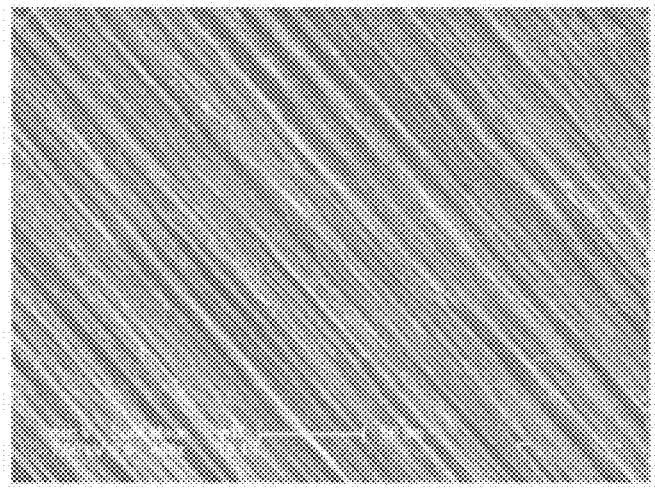
FIG. 4 is a scanning electron microscope (SEM) photo of an embodiment of a carbon nanotube film.

Referring to FIG. 4, the carbon nanotube film 1242 comprises a plurality of carbon nanotubes. A large number of the plurality of carbon nanotubes in the carbon nanotube film 1242 can be oriented along a preferred direction, meaning that a large number of the plurality of carbon nanotubes in the carbon nanotube film 1242 are arranged substantially along the same direction. The plurality of carbon nanotubes that are arranged substantially parallel to a surface of the carbon nanotube film 1242. A large number of the plurality of carbon nanotubes in the carbon nanotube film 1242 are combined together by Van der Waals force. An end of one carbon nanotube is joined to an end of an adjacent carbon nanotube arranged substantially along the same direction by Van der Waals force, to form a free-standing film. The term 'free-standing' includes films that do not have to be supported by a substrate. A minority of the plurality of carbon nanotubes in the carbon nanotube film 1242 may be randomly aligned. However, the number of randomly aligned carbon nanotubes is very small and does not affect the overall oriented alignment of the majority of the plurality of carbon nanotubes in the carbon nanotube film 1242. The majority of the plurality of carbon nanotubes in the carbon nanotube film 1242 is substantially aligned along the same direction and may not be exactly straight. They may be curved to a certain degree, or are not exactly aligned along the overall aligned direction, and can deviate from the overall aligned direction by a certain degree. Therefore, partial contact can exist between the randomly aligned carbon nanotubes and adjacent carbon nanotubes. A gap can also exist between the carbon nanotubes of the carbon nanotube film 1242. A thickness of the carbon nanotube film 1242, at the thickest, ranges from about 0.5 nm to about 100 μm. In one embodiment, the thickness of the carbon nanotube film 1242 at the thickest ranges from about 0.5 nm to about 10 μm.

A method for fabricating the carbon nanotube film 1242 by drawing from a carbon nanotube array comprises the steps of: (a) selecting a plurality of carbon nanotube segments having a predetermined width from the carbon nanotube array, by using a tool (e.g., adhesive tape or another tool allowing multiple carbon nanotubes to be gripped and pulled simultaneously); and (b) pulling the carbon nanotube segments at an even/uniform speed to form the carbon nanotube film 1242. Examples of the method for fabricating the carbon nanotube film 1242 are taught for instance by U.S. Pat. No. 8,048,256 to Feng et al.

In step (a), quite usefully, the carbon nanotube segments having a predetermined width can be selected by using a wide adhesive tape as the tool to contact the carbon nanotube array. In step (b), the pulling direction is, usefully, substantially perpendicular to the growing direction of the carbon nanotube array of carbon nanotubes.

More specifically, during the pulling process, as the initial carbon nanotube segments are drawn out, other carbon nanotube segments are also drawn out end to end due to Van der Waals attractive force between ends of the adjacent segments. This process of drawing ensures a successive carbon nanotube film can be formed. The carbon nanotubes of the carbon nanotube film are all substantially parallel to the pulling direction, and the carbon nanotube film produced in such manner has a selectable, predetermined, width.

The carbon nanotube film 1242 has a minimum electrical resistance along an extending direction of the carbon nanotubes and has a maximum electrical resistance in a direction perpendicular to the extending direction. The carbon nanotube film 1242 is an electrically anisotropic film. A first direction is defined as a lowest impedance direction. Conductivity along the first direction is much larger than conductivity along other directions. A second direction is defined as a highest impedance direction. Conductivity along the second direction is much smaller than conductivity along other directions. The first direction is substantially perpendicular to the second direction. The carbon nanotube film 1242 can be rectangular having four sides; wherein two opposite sides are parallel to direction H, and the other two opposite sides are parallel to the first direction. Since the carbon nanotube film 1242 is an electrically anisotropic film, multi-touch can be sensed by the carbon nanotube touch function layer 124. A ratio of the impedance of the second direction to that of the first direction is larger than or equal to 50. In one embodiment, the ratio of the impedance of the second direction to that of the first direction ranges from about 70 to about 500. The carbon nanotube touch function layer 124 can comprise a plurality of carbon nanotube films 1242. A great majority of the carbon nanotubes in a plurality of carbon nanotube films 1242 are arranged along the same direction. The plurality of carbon nanotube films 1242 can be stacked with or on each other. The plurality of carbon nanotube films 1242 can also be coplanar and be in contact with each other. Thus, a length and a width of the flexible touch panel 120 are not limited and can be selected according to need.

The plurality of first electrodes 1244 can be located on a first side of the carbon nanotube film 1242. These are arranged along the second direction. The plurality of first electrodes 1244 are spaced apart from each other. A space between adjacent first electrodes in the plurality of first electrodes 1244 can range from about 1 mm to about 8 mm. A length of each of the plurality of first electrodes 1344 along the second direction can range from about 1 mm to about 8 mm. The plurality of second electrodes 1245 can be located on a second side of the carbon nanotube film 1242. The second side of the carbon nanotube film 1242 is opposite to the first side of the carbon nanotube film 1242. Each of the plurality of second electrodes 1245 are spaced apart from each other. The plurality of first electrodes 1244 and the plurality of second electrodes 1245 are one-to-one along the first direction. A space between each adjacent second electrode in the plurality of second electrodes 1245 can range from about 1 mm to about 8 mm. A length of each second electrode of the plurality of second electrodes 1245 along the second direction can range from about 1 mm to about 8 mm. A signal input to the carbon nanotube film 1242 from the plurality of first electrodes 1344 and the plurality of second electrodes 1245 is mainly transported along the first direction. The carbon nanotube touch function layer 124 can determine a touch point position by a directional signal transmission. A size and a spacing of the plurality of first electrodes 1244 and of the plurality of second electrodes 1245 are not limited and can be selected according to need.

The carbon nanotube touch function layer 124 can further comprise a driving circuit (not shown) electrically connected to the plurality of first electrodes 1244. The driving circuit scans the plurality of first electrodes 1244 and the plurality of second electrodes 1245 step by step to scan for an electrical signal. When the protective cover 130 of the touch control armrest sleeve 100 is touched, a capacitance is generated between the carbon nanotube film 1242 and the fingertip or other conductive medium. The capacitance is alternately charged and discharged by a charging circuit and a memory circuit of the driving circuit. A capacitance charging, such as voltage value, is recorded, and the touch point position can be determined according to the capacitance charging. In one embodiment, the charging circuit is a voltage source; and the memory circuit is a capacitor.

Since the carbon nanotube film 1242 is an electrically anisotropic film, an electrical current is mainly transported along the first direction. When a certain position on the protective cover 130 corresponding to the carbon nanotube film 1242 is touched, different electrical signals can be detected by the plurality of first electrodes 1244 and the plurality of second electrodes 1245 at different locations. The closer a touch point may be to the plurality of first electrodes 1244 or the plurality of second electrodes 1245, the larger will be the signal received by the plurality of first electrodes 1244 or the plurality of second electrodes 1245. A coordinate of the touch point along the first direction of the carbon nanotube touch function layer 124 can be determined, according to a first signal value received by the plurality of first electrodes 1244 and a second signal value received by the plurality of second electrodes 1245. A method of determining a touch point coordinate along the second direction of the carbon nanotube touch function layer 124 comprises the following steps: Firstly, a larger signal value from signal values received by adjacent first electrodes 1244 is defined as a third signal value, and a larger signal value from signal values received by adjacent second electrodes 1245 is defined as a fourth signal value. Secondly, interpolating the third signal value and the fourth signal value, or adding the third signal value and the fourth signal value in a proportional relationship. Finally, the touch point coordinates along the second direction can be obtained. The proportional relationship can be determined based on a change in received signal values during a simulation process.

The connecting portion 20 comprises a third end and a fourth end opposite to the third end. The third end is connected to the first end of the body 10. The fourth end is connected to the second end of the body 10. The touch control armrest sleeve 100 is an annular structure when it is sleeved on the armrest. The connecting portion 20 and the body 10 can be sewn together or bonded together with an adhesive. In one embodiment, a width of the connecting portion 20 is the same as a width of the body 10. The width of the connecting portion 20 is a length of the connecting portion 20 along an axial direction of the annular structure. The width of the body 10 is a length of the body 10 along the axial direction of the annular structure.

A structure and a material of the connecting portion 20 are not limited, as long as the connecting portion 20 can be connected to the body 10 to form the annular structure. The connecting portion 20 can be an integral structure or a split structure.

In one embodiment, the connecting portion 20 is the integral structure, and the connecting portion 20 can be an elastic band. The elastic band can be stretched to a certain length to allow the touch control armrest sleeve 100 to be set over the armrest of the seat. In one embodiment, a fifth end of the elastic band is connected to the first end of the body 10, and a sixth end of the elastic band is connected to the second end of the body 10, to form the annular structure.

When the connecting portion 20 is the split structure, the connecting portion 20 comprises a first connecting piece and a second connecting piece which are matched with each other. The first connecting piece is located on the first end of the body 10, and the second connecting piece is located on the second end of the body 10. A matched junction of the first connecting piece and the second connecting piece connects the first end and the second end together to form the annular structure. The connecting portion 20 can be a snap structure or an adhesive structure. The snap structure can be locking components or a zipper. The adhesive structure can be a magnetic adsorption structure or a viscous structure.

In one embodiment, the connecting portion 20 is the locking components. The locking components comprise a buckle and a buckled seat matched with the buckle. The buckle is fixed to the first end of the body 10. The buckle seat is fixed to the second end of the body 10. The connecting portion 20 is connected to the body 10 by a nested buckle formed by the buckle and the buckle seat to form the annular structure.

In one embodiment, the connecting portion 20 is the magnetic adsorption structure. The magnetic adsorption structure comprises at least two magnetic buttons. At least one magnetic button is located at the first end of the body 10, and at least one magnetic button is located at the second end of the body 10. The first end and the second end of the body 10 are bonded together by mutual attraction of the magnetic buttons to form the annular structure.

In one embodiment, the touch control armrest sleeve 100 further comprises a connection belt. The connection belt is connected to the body 10 and the connecting portion 20 to form the touch control armrest sleeve 100. The connection belt can be inelastic or elastic. In one embodiment, the connection belt is elastic; an annulus size of the touch control armrest sleeve 100 can be adjusted to expand a practical range of the touch control armrest sleeve 100.

The touch control armrest sleeve 100 is used to remote control the touch screen display. The touch control armrest sleeve 100 can be located on any armrests that match the annular structure of the touch control armrest sleeve 100.

Figure 5:
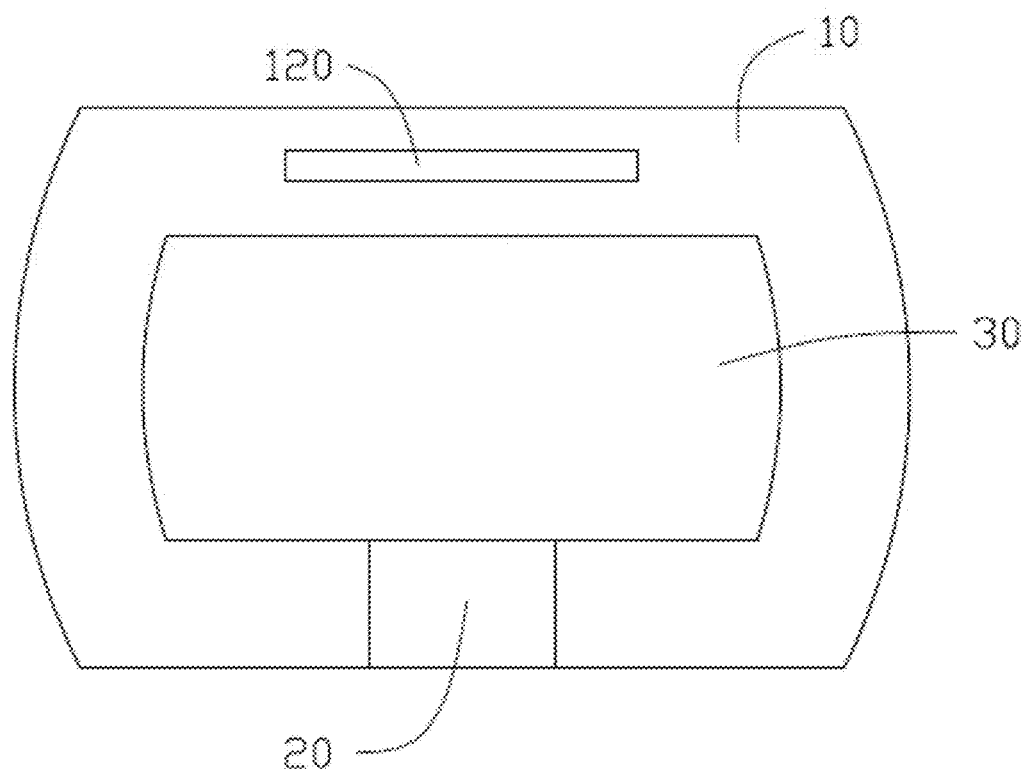
FIG. 5 is a structure schematic view of an embodiment of a cross section of the touch control seat armrest.

Referring to FIG. 5, a seat armrest 30 using the touch control armrest sleeve 100 is provided. The touch control armrest sleeve 100 wraps around and is fixed on an outer surface of the seat armrest 30. The touch control armrest sleeve 100 is the annular structure.

The seat armrest 30 is a rigid structure. The seat armrest 30 can provide support for the flexible pad 110 of the touch control armrest sleeve 100. An upper side of the seat armrest 30 is a position where a user places the arm.

The touch control armrest sleeve 100 wraps around the outer surface of the seat armrest 30 in a first direction. The first direction is perpendicular to an axial direction of the seat armrest 30. A first shape and a first size of a first cross section of the touch control armrest sleeve 100 in the first direction are matched to a second shape and a second size of a second cross section of the seat armrest 30 in the first direction, therefore, the touch control armrest sleeve 100 can be fixed on the outer surface of the seat armrest 30 and is not easily disengaged.

When the connecting portion 20 is the integral structure, the touch control armrest sleeve 100 can directly cover the outer surface of the seat armrest 30. Since the connecting portion 20 is the elastic band, the first size of the first cross section of the touch control armrest sleeve 100 in the first direction can be slightly less than or equal to the second size of the second cross section of the seat armrest 30 in the first direction, the touch control armrest sleeve 100 can be close contact with and fixed to the seat armrest 30 by an elasticity of the connecting portion 20.

When the connecting portion 20 is the split structure, the touch control armrest sleeve 100 can be wrapped about the outer surface of the seat armrest 30. The touch control armrest sleeve 100 can contact with and fixed to the seat armrest 30 by the first connecting piece and the second connecting piece. The first size of the first cross section of the touch control armrest sleeve 100 in the first direction is equal to the second size of the second cross section of the seat armrest 30 in the first direction. When the connecting portion 20 comprises the connection belt, and the connection belt is elastic; the first size of the first cross section of the touch control armrest sleeve 100 in the first direction can be less than or equal to the second size of the second cross section of the seat armrest 30 in the first direction. In one embodiment, the touch control armrest sleeve 100 is located at an end of the seat armrest 30 away from the seat back.

The flexible touch panel 120 is located at an upper side of the seat armrest 30, in order to facilitate the user to operate the flexible touch panel 120 when placed arms on the seat armrest 30. When the user places an arm on the seat armrest 30, a palm of the user is located substantially above the flexible touch panel 120. In one embodiment, the flexible touch panel 120 is below the fingers of the user.

In one embodiment, the connecting portion 20 of the touch control armrest sleeve 100 is located on an underside of the seat armrest 30.

When the display screen is operated by the touch control armrest sleeve 100 or the touch-type seat 200 at a long distance, the display screen is connected to the touch control armrest sleeve 100 and transfer data through a wireless connection or a wired connection. The wireless connection can be WI-FI, infrared, BLUETOOTH or the like connection. The wireless connection can be achieved by a first wireless communication module located on the display screen and a second wireless communication module located in the flexible touch panel 120. The wired connection can connect the display screen to the flexible touch panel 120 via a data line.

When users interactively operate the long-distance display screen, users need not to lean forward to touch the display screen; the users can touch an area where the flexible touch panel 120 is located on the touch control armrest sleeve 100 while watching the display screen. The flexible touch panel 120 is embedded in the protective cover 130, and the protective cover 130 has a thin thickness; thus, the position of the touch point of the flexible touch panel 120 can still be determined by sensing the capacitance change. When users in the absence of touch, the touch control armrest sleeve 100 is fully functional as a comfortable support. The flexible touch panel 120 is an elastic structure and has a thin thickness, and the elasticity and comfort of the touch control armrest sleeve 100 is, therefore, unaffected by the flexible touch panel 120 embedded in the protective cover 130. The flexible touch panel 120 embedded in the protective cover 130 does not affect the appearance of the touch control armrest sleeve 100. The touch control armrest sleeve 100 is detachable, which can be removed at any time and set in any of the touch armrests to match the touch control armrest sleeve.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A touch control armrest sleeve comprising:
   a body and a connecting portion, the body comprising:
   a first end and a second end opposite to the first end;
   a flexible pad, wherein a material of the flexible pad is selected from the group consisting of sponge, fabric, cotton, and plastic foam;
   a flexible touch panel located on the flexible pad comprising a flexible substrate and a carbon nanotube touch function layer; wherein the carbon nanotube touch function layer comprises a carbon nanotube film, a plurality of first electrodes, and a plurality of second electrodes; the carbon nanotube film is located on a flexible substrate surface; and the plurality of first electrodes and the plurality of second electrodes are electrically connected to the carbon nanotube film; and
   a protective cover wrapping around the flexible touch panel, wherein a material of the protective cover is selected from the group consisting of animal leather, artificial leather, and fabric;
   wherein the connecting portion is connected to the first end and the second end, and the touch control armrest sleeve is configured to remote control a display screen spaced from the touch control armrest sleeve.

2. The touch control armrest sleeve of claim 1, wherein the connecting portion is an integral structure.

3. The touch control armrest sleeve of claim 1, wherein the connecting portion comprises a first connecting piece and a second connecting piece; the first connecting piece is located on the first end, and the second connecting piece is located on the second end; and the first end and the second end are connected together by a matched junction of the first connecting piece and the second connecting piece.

4. The touch control armrest sleeve of claim 3, wherein the connecting portion is selected from the group consisting of zipper, magnetic adsorption structure and viscous structure.

5. The touch control armrest sleeve of claim 1, further comprising a connection belt connected to the body and the connecting portion.

6. The touch control armrest sleeve of claim 1, wherein the flexible touch panel further comprises a flexible protective layer, and the carbon nanotube film is located between the flexible protective layer and the flexible substrate.

7. The touch control armrest sleeve of claim 6, wherein a material of the flexible protective layer is selected from the group consisting of cellulose triacetate (TAC), polystyrene, polyethylene, polycarbonate (PC), poly (methyl methacrylate) (PMMA), Polyethylene terephthalate (PET), benzocyclobutene (BCB), and polycycloolefin.

8. The touch control armrest sleeve of claim 1, wherein the flexible touch panel further comprises a flexible protective layer, and a thickness of the flexible protective layer is in a range from about 0.5 micron to about 1 millimeter.

9. The touch control armrest sleeve of claim 1, wherein the carbon nanotube film is an electrically anisotropic film; and a first direction is defined as a lowest impedance direction, a second direction is defined as a highest impedance direction, and the first direction is substantially perpendicular to the second direction.

10. The touch control armrest sleeve of claim 9, wherein the carbon nanotube film comprises a first side and a second side opposite to the first side, the first side and the second side are parallel to the second direction; and the plurality of first electrodes are located on the first side and the plurality of second electrodes are located on the second side.

11. The touch control armrest sleeve of claim 9, wherein the carbon nanotube film comprises a plurality of carbon nanotubes, a large number of the plurality of carbon nanotubes extend along the first direction and are parallel to a surface of the flexible substrate.

12. The touch control armrest sleeve of claim 11, wherein an end of one carbon nanotube is joined to an end of an adjacent carbon nanotube along the first direction by van der Waals force.

13. The touch control armrest sleeve of claim 1, wherein the carbon nanotube touch function layer is a single layer structure.

14. The touch control armrest sleeve of claim 1, wherein the carbon nanotube touch function layer further comprise a driving circuit electrically connected to the plurality of first electrodes; the driving circuit scans the plurality of first electrodes and the plurality of second electrodes step by step to scan for an electrical signal; when the carbon nanotube touch function layer is touched by a conductive medium, a capacitance is generated between the carbon nanotube film and the conductive medium; the capacitance is alternately charged and discharged by a charging circuit and a memory circuit of the driving circuit; a capacitance charging is recorded, and a touch point position is determined according to the capacitance charging.

15. The touch control armrest sleeve of claim 1, wherein a thickness of the carbon nanotube film ranges from about 0.5 nm to about 100 μm.

16. The touch control armrest sleeve of claim 1, wherein the connecting portion and the body are sewn together.

17. The touch control armrest sleeve of claim 1, wherein the touch control armrest sleeve transfers data to the display screen through a wireless connection.

18. A touch control seat comprising:
   a seat armrest comprising an outer surface; and
   a touch control armrest sleeve wrapping around and fixed on the outer surface of the seat armrest and comprising a body and a connecting portion, the body comprising:
   a first end and a second end opposite to the first end;
   a flexible pad, wherein a material of the flexible pad is selected from the group consisting of sponge, fabric, cotton, and plastic foam;
   a flexible touch panel located on the flexible pad comprising a flexible substrate and a carbon nanotube touch function layer; wherein the carbon nanotube touch function layer comprises a carbon nanotube film, a plurality of first electrodes, and a plurality of second electrodes; the carbon nanotube film is located on a flexible substrate surface; the plurality of first electrodes and the plurality of second electrodes are electrically connected to the carbon nanotube film; and a protective cover wrapping around the flexible touch panel, wherein a material of the protective cover is selected from the group consisting of animal leather, artificial leather, and fabric;

wherein the connecting portion is connected to the first end and the second end and the touch control armrest sleeve is configured to remote control a display screen spaced from the touch control armrest sleeve.

19. The touch control seat of claim 18, wherein the touch control armrest sleeve is wrapped around the outer surface of the seat armrest in a first direction, and the first direction is perpendicular to an axial direction of the seat armrest.

20. The touch control seat of claim 19, wherein the connecting portion is elastic, a first size of a first cross section of the touch control armrest sleeve in the first direction is slightly less than a second size of a second cross section of the seat armrest in the first direction.

* * * * *